United States Patent [19]

Lon-Jeng

[11] Patent Number: 4,886,457

[45] Date of Patent: Dec. 12, 1989

[54] LEARNING AID TO ENLIGHTEN INTELLIGENCE FOR CHILDREN

[76] Inventor: Lin Lon-Jeng, 211, Ku Shan 2rd Road, Kaohsiung City, Taiwan

[21] Appl. No.: 231,363

[22] Filed: Aug. 12, 1988

[51] Int. Cl.⁴ ............................................. G09B 19/00
[52] U.S. Cl. .................................... 434/191; 273/155; 273/161; 434/427
[58] Field of Search ........................ 434/191, 188, 427; 273/161, 155

[56] References Cited

U.S. PATENT DOCUMENTS

| | | | |
|---|---|---|---|
| 764,209 | 7/1904 | Semle | 273/161 X |
| 840,144 | 1/1907 | Lincoln | 273/161 |
| 2,460,563 | 2/1949 | Zelvin | 273/155 |

Primary Examiner—William H. Grieb
Attorney, Agent, or Firm—Kirschstein, Ottinger, Israel & Schiffmiller

[57] ABSTRACT

A learning aid for children comprising a plurality of auxiliary charts each having a plurality of contents for learning easy addition or subtraction by means of memorizing one content by one person (teacher) and asking questions by another person (learner). The answers by the teacher cause the lerner to add or subtract according to designated numerals of said charts, thereby leading to the content memorized. A main chart, showing sheets or a numeral sheet may also be used.

11 Claims, 10 Drawing Sheets

| ¹11 | 3 | 9 | 13 |
|---|---|---|---|
| 5 | 1 | 15 | 7 |

Fig. 14

| ²15 | 3 | 6 | 14 |
|---|---|---|---|
| 10 | 11 | 7 | 2 |

Fig. 15

| ⁴12 | 5 | 14 | 7 |
|---|---|---|---|
| 4 | 13 | 6 | 15 |

Fig. 16

| ⁸12 | 9 | 14 | 11 |
|---|---|---|---|
| 8 | 13 | 10 | 15 |

Fig. 17

| ¹7 | 13 | 5 | 15 |
|---|---|---|---|
| 1 | 11 | 3 | 9 |

Fig. 18

| ²1 | 10 | 9 | 2 |
|---|---|---|---|
| 5 | 14 | 6 | 13 |

Fig. 19

| ⁴10 | 1 | 2 | 9 |
|---|---|---|---|
| 12 | 4 | 11 | 3 |

Fig. 20

| ⁸7 | 1 | 5 | 3 |
|---|---|---|---|
| 2 | 8 | 4 | 6 |

LEARNING AID TO ENLIGHTEN INTELLIGENCE FOR CHILDREN

BACKGROUND OF THE INVENTION

What are commonly used in enlightening children to acquire intelligence are generally classified into two categories, one is to develop their mind and the other is to acquaint them with things. Toys and building blocks belong to the former and figures, quantity, alphabets, characteris, animals, plants, addition, subtraction, etc. belong to the latter. Both have different features in the practical educational functions. Recreational things like toys and building blocks, can give children much interest but contain less knowledge. On the contrary, acquainting things like books can hardly arouse the interest of the children and only force them to learn it by heart. Psychologically speaking, children would rather accept enlightening and recreational teaching and learning more easily than dull, acquainting teaching and learning. Therefore, it is an important necessity to supply a learning aid for children to learn with interest by means of playing.

This learning aid has been devised by me, based on long experience in producing related things for children.

SUMMARY OF THE INVENTION

This learning aid has five sets of examples in accordance with the present invention.

The first set includes four auxiliary charts, four showing sheets and a main chart. Each auxiliary chart has the same number of contents including numerals, numbers, alphabets, words, figures, signs, animals, plants, etc, but the contents each auxiliary chart has are partly different. The main chart has all the different contents that all of the auxiliary charts have. Each showing sheet has a special corresponding auxiliary chart to match with in use and has square windows punched out at the same locations of the contents in the main chart as the corresponding auxiliary chart.

In using this set, two persons, say a teacher and a learner, take part. The teacher memorizes a content, for example a butterfly, and then the learner asks the teacher which of the auxiliary charts has the content he memorized. If the teacher answers that the first auxiliary chart does not have it, then the learner puts the first showing sheet on the main chart upside down. If the answer for the second chart is affirmative, then he puts the second showing sheet on the first sheet in the right way, and so on for the rest of the charts. All the showing sheets are place one by one on the main chart so that only one content in the main chart appear in one of the square window in the showing sheets, thereby indicating the correct answer for the content the teacher memorized.

The second set includes four auxiliary charts for learning addition, and the fourth set includes a main chart and a numeral sheet in addition to four auxiliary charts for learning addition in a more complicated way than the second one.

The third set includes four auxiliary charts for learning subtraction and the fifth set includes a main chart and a numeral sheet in addition to four auxiliary charts for learning subraction in a more complicated way than the third one.

All the four auxiliary charts have the same number of contents and have a designated numeral each for addition and subtraction. In learning addition or subtraction, for example, two persons, say a teacher and a learner, are needed. At first the teacher memorizes one content, for example 13, and then the learner asks the teacher which of the charts has that content. After the teacher answers, the learner adds up the designated numerals of the charts having 13, for example 1 (the chart 30)+4 (the chart 32)+8 (the chart 33)=13. Then he knows the correct answer is 13. In learning subtraction, a subtraction total number, one more than all the different contents the charts have, is needed, for example, 1+15=16. At first, the teacher memorizes one content, for example, 9. Then the learner asks the teacher which of the charts has it. After the teacher answers, the learner makes subtraction, for example, 16−1 (the chart 40)−2 (the chart 41)−4 (the chart 42)=9. So the learner knows the answer is 9.

The fourth set for addition and the fifth set for subtraction can also be used as the second and the third set, but only in a more complicated way.

DETAILED DESCRIPTION OF THE INVENTION

At first, the first set of the learning aid shown in FIGS. 1–9 includes four auxiliary charts 10, 11, 12, 13 and showing sheets 101, 111, 121, 131 and a main chart 2. The number of the auxiliary charts and the showing sheets can be changed according to the contents, but both should be the same number. Each auxiliary chart has the same number of the contents for recognition. The contents can be numeral, figures, alphabets, characters, signs, animals, plants, words etc. The main chart 2 has all the different contents included in all the auxiliary charts 10, 11, 12, 13. The showing sheet 101 is used corresponding to the auxiliary chart 10, and has square windows 102 cut out at the locations where the contents of the auxiliary chart 10 are printed in the main chart 2. Then in the same way the showing sheet 111 has square windows 112 cut out at the same locations in the main chart 2 according to the contents of the auxiliary chart 11, and so do the showing sheets 121, 131 have square windows 122, 132 according to the auxiliary charts 12, 13.

Figure 1:
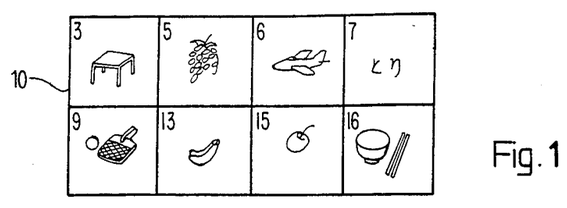
FIG. 1 is the auxiliary chart 10 in the first set of the learning aid in accordance with the present invention.
Figure 2:
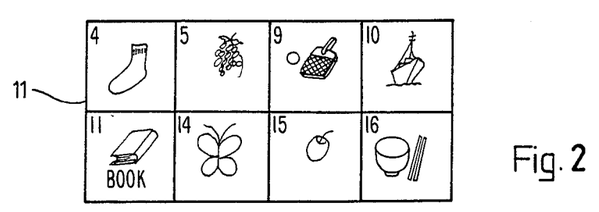
FIG. 2 is the auxiliary chart 11 in the first set of the learning aid in accordance with the present invention.
Figure 3:
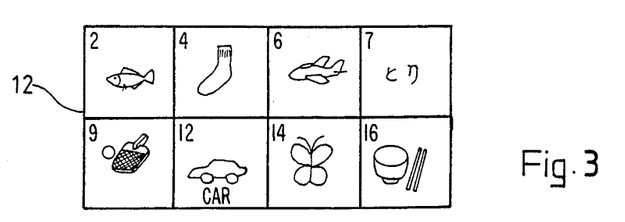
FIG. 3 is the auxiliary chart 12 in the first set of the learning aid in accordance with the present invention.
Figure 4:
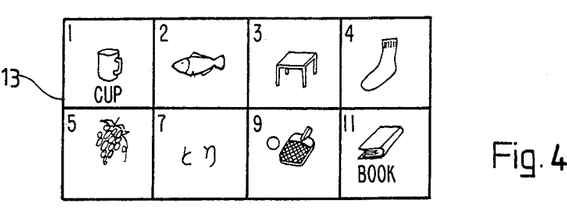
FIG. 4 is the auxiliary chart 13 in the first set of the learning aid in accordance with the present invention.
Figure 5:
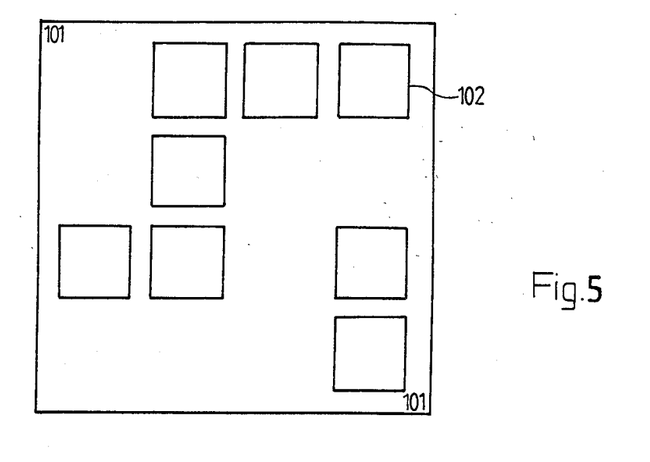
FIG. 5 is the showing sheet 101 in the first set of the learning aid in accordance with the present invention.
Figure 6:
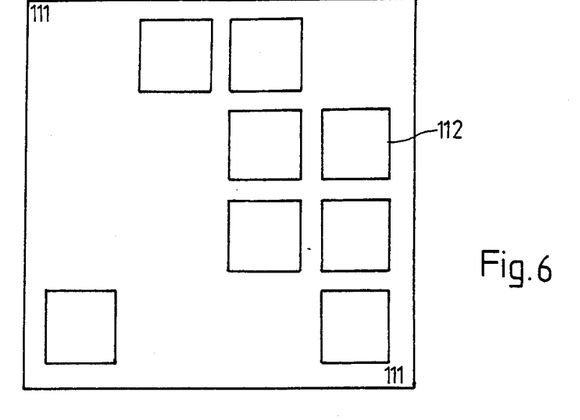
FIG. 6 is the showing sheet 111 in the first set of the learning aid in accordance with the present invention.
Figure 7:
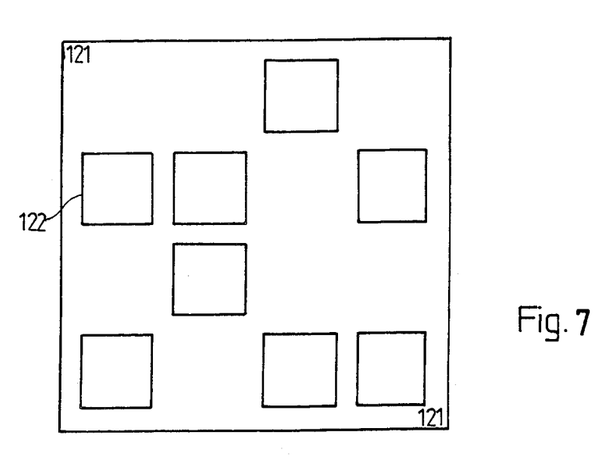
FIG. 7 is the showing sheet 121 in the first set of the learning aid in accordance with the present invention.
Figure 8:
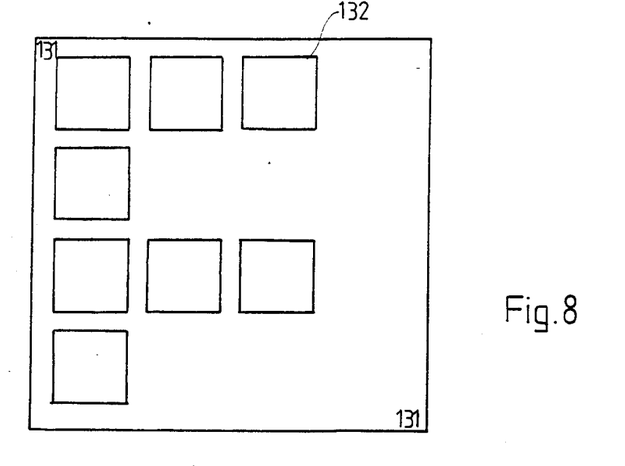
FIG. 8 is the showing sheet 131 in the first set of the learning aid in accordance with the present invention.
Figure 9:
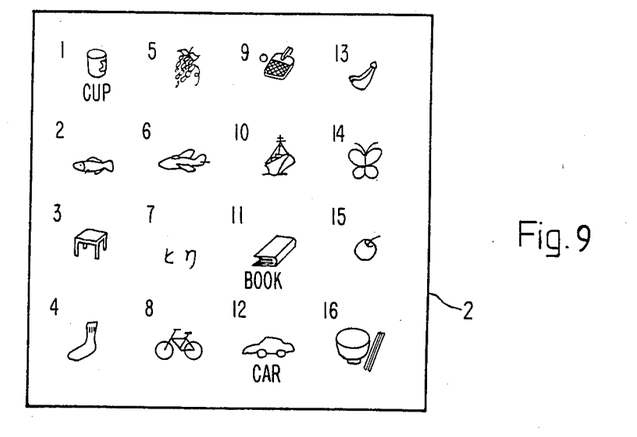
FIG. 9 is the main chart 2 in the first set of the learning aid in accordance with the present invention.

FIGS. 1–4 show the examples of the auxiliary charts 10, 11, 12, 13. FIGS. 5–8 show the examples of the showing sheets 101, 111, 121, 131. FIG. 9 shows the example of the main chart 2.

Next the use of the first set of the learning aid just described above is described in reference to FIGS. 10–13. In using this learning aid two persons, say a teacher and a learner, are needed.

Figure 10:
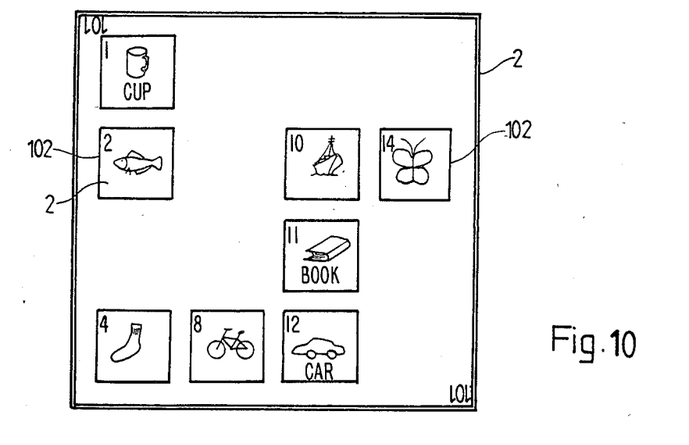
FIG. 10 is the first example of using the first set of the learning aid in accordance with the present invention.
Figure 11:
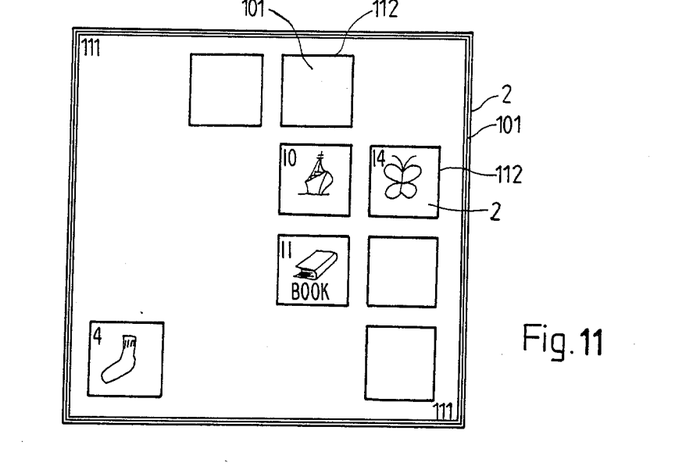
FIG. 11 is the second example of using the first set of the learning aid in accordance with the present invention.
Figure 12:
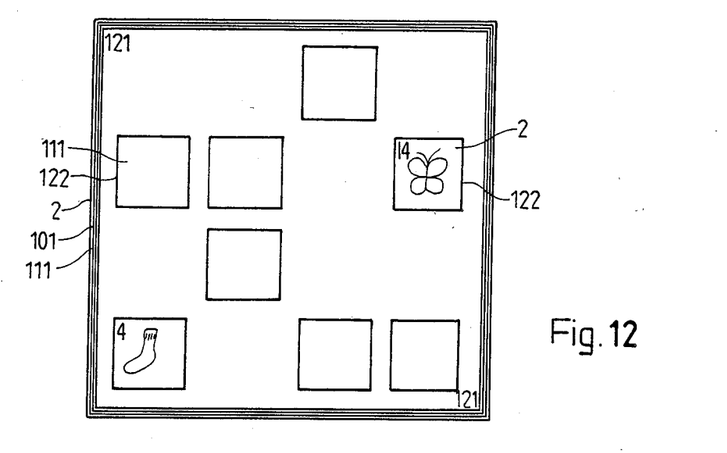
FIG. 12 is the third example of using the first set of the learning aid in accordance with the present invention.
Figure 13:
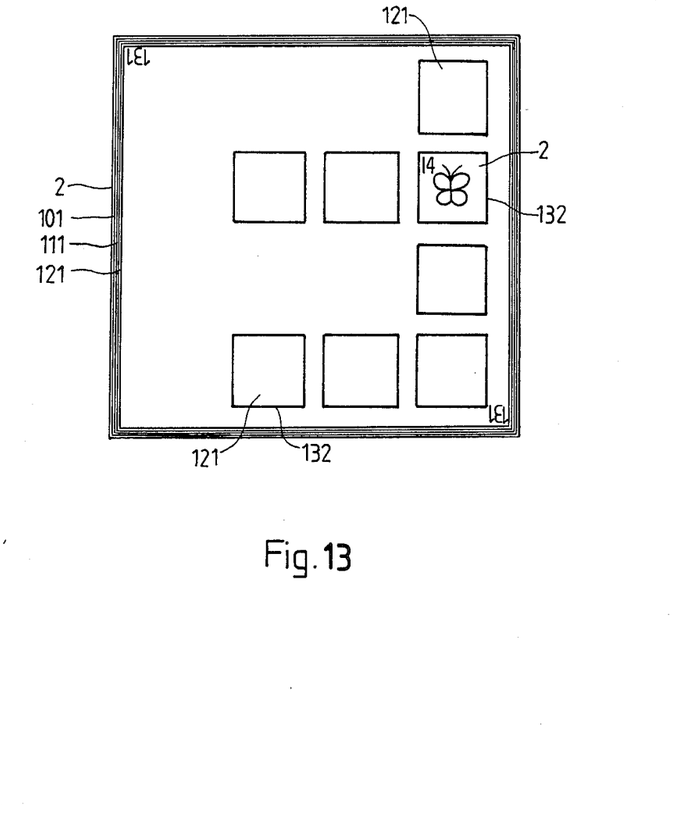
FIG. 13 is the fourth example of using the first set of the learning aid in accordance with the present invention.
Figure 14:
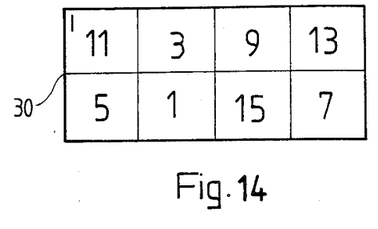
FIG. 14 is the auxiliary chart 30 for addition in the second set of the learning aid in accordance with the present invention.
Figure 15:
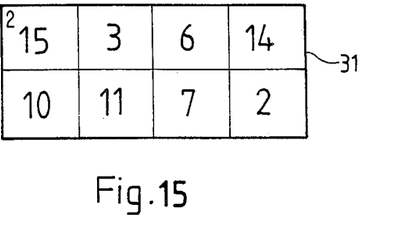
FIG. 15 is the auxiliary chart 31 for addition in the second set of the learning aid in accordance with the present invention.
Figure 16:
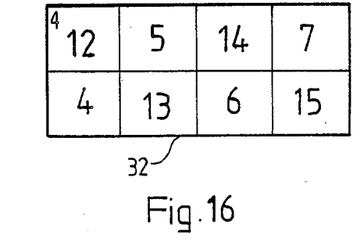
FIG. 16 is the auxiliary chart 32 for addition in the second set of the learning aid in accordance with the present invention.
Figure 17:
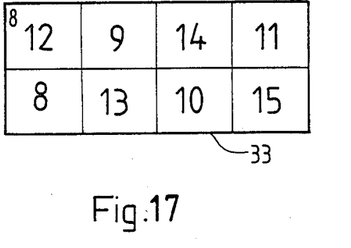
FIG. 17 is the auxiliary chart 33 for addition in the second set of the learning aid in accordance with the present invention.
Figure 18:
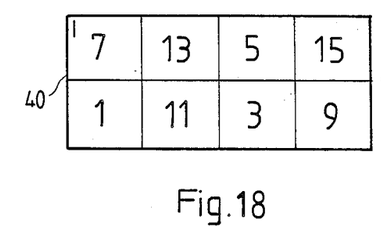
FIG. 18 is the auxiliary chart 40 for subtraction in the third set of the learning aid in accordance with the present invention.
Figure 19:
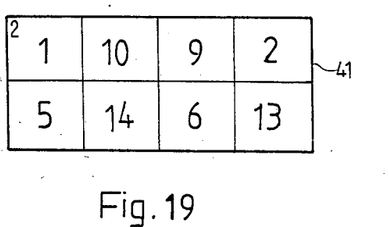
FIG. 19 is the auxiliary chart 41 for subtraction in the third set of the learning aid in accordance with the present invention.
Figure 20:
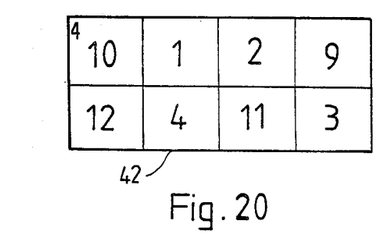
FIG. 20 is the auxiliary chart 42 for subtraction in the third set of the learning aid in accordance with the present invention.
Figure 21:
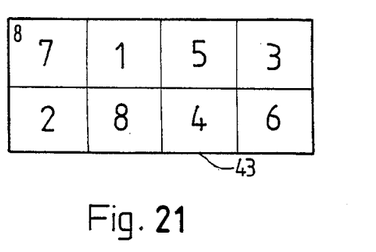
FIG. 21 is the auxiliary chart 43 for subtraction in the third set of the learning aid in accordance with the present invention.
Figure 22:
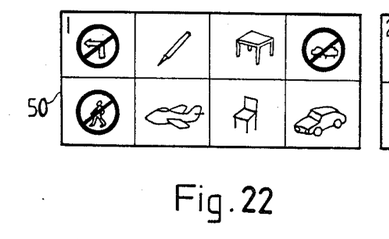
FIG. 22 is the auxiliary chart 50 for addition in the fourth set of the learning aid making use of FIGS. 14–17 in accordance with the present invention.
Figure 23:
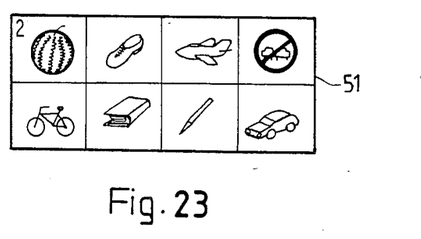
FIG. 23 is the auxiliary chart 51 for addition in the fourth set of the learning aid making use of FIGS. 14–17 in accordance with the present invention.
Figure 24:
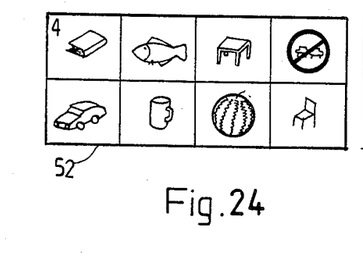
FIG. 24 is the auxiliary chart 52 for addition in the fourth set of the learning aid making use of FIGS. 14–17 in accordance with the present invention.
Figure 25:
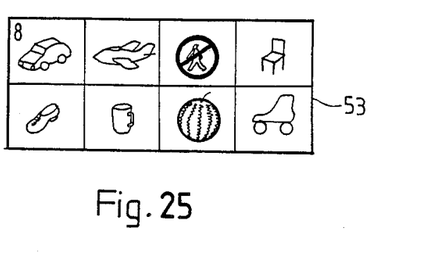
FIG. 25 is the auxiliary chart 53 for addition in the fourth set of the learning aid making use of FIGS. 14–17 in accordance with the present invention.

The teacher at first memorizes one content in any of the auxiliary charts 10–13, for example 14 which depicts a butterfly. Then the learner asks the teacher which of the auxiliary charts has the content he has memorized, and the teacher answers the chart 10 does not. The learner then places the showing sheet 101 upside down on the main chart 2 as shown in FIG. 10. For the next step, the teacher again gives the learner an answer that the chart 11 has the content he has memorized, and the learner places the showing sheet 111 on the showing sheet 101 in the right way. For the third step, the teacher gives the learner one more answer that the chart 12 does have it, and the learner puts the showing sheet 121 on the showing sheet 111 in the right way. Finally the teacher gives the last answer that the chart 13 does not have, and the learner puts the showing sheet 131 on the showing sheet 121 upside down as shown in FIG. 13. Now all of the showing sheets 101, 111, 121, 131 are placed one on another, and only one content in the main chart is seen through a square window, and that is 14, and a butterfly. Since it is the content the teacher has memorized, the learner can state what the teacher has memorized, recognizing and learning the thing included in the content through the recreational process of mutual questions and answers between the two persons and the manipulation of the auxiliary charts, the showing sheets and the main chart by the learner.

What is important in using the first example is that the showing sheet 101 should be used when matching with the auxiliary chart 10, the sheet 111 with the chart 11, the sheet 121 with the chart 12 and the sheet 131 with the chart 13. Also, the placement of the showing sheets 101, 111, 121. 131 on the main chart 2 whether in the right way or upside down should depend on if the content the teacher memorizes exists on each of the charts 10–13 or not; in case it exists the sheet should be placed in the right way, and in case it does not the sheet should be placed upside down. Otherwise the right content will not appear in the superimposed sheets. The number of the contents of the main chart 2 can be one more than the number of the contents all the charts 10–13 have. The content in each chart 10, 11, 12 or 13 can be partly same and partly different, but the number of the contents must be equal. However, all the auxiliary charts are not necessarily manipulated in order in using, and the same answer can appear.

Next, the second set of the learning aid shown in FIGS. 14–17 consists of a plurality of auxiliary charts, four in this example, but any number will do, and the contents of the auxiliary charts 30–33 can be alphabets, words, figures, numerals, marks, animals, plants, fruits, etc. The contents of the auxiliary chart 30 are Arabic numerals, 1, 3, 5, 7, 9, 11, 13, 15, those of the chart 31 are 2, 3, 6, 7, 10, 11, 14, 15, those of the chart 32 are 4, 5, 6, 7, 12, 13, 14, 15, and those of the chart 33 are 8, 9, 10, 11, 12, 13, 14, 15. There are 8 numerals in each chart, each chart having the same numbered of contents. This second set is for addition, and the learning process through playing this set should be based on addition. Each auxiliary chart 30, 31, 32 or 33 should have a designated figure for addition, and the chart 30 has 1, the chart 31 has 2, the chart 32 has 4 and the chart 33 has 8. Now in using this set two persons, a teacher and learner, should take part. At first the teacher memorizes at random a content in any chart 30, 31, 32 or 33, for example 13, and then the learner asks the teacher which of the charts 30—33 has the content he memorized. After the teacher gives the answer that the charts 30, 32, 33 have it, the learner has to add together the designated numerals of those charts 30, 32, 33. For example, 1 (the chart 30)+4 (the chart 32)+8 (the chart 33)=13. Then the learner can state the content the teacher memorized, so the learner learns addition through mutual questions and answers with the teacher and finding out the content with addition.

Next, the third set of the learning aid for subtraction shown in FIGS. 18–21 includes four auxiliary charts 40–43, and each chart has the same designated numeral as the charts 30–33 for addition have, that is, the chart 40 has 1, the chart 41 has 2, the chart 42 has 4 and the chart 43 has 8. The contents of the chart 40 are 1, 3, 5, 7, 9, 11, 13, 15, those of the chart 41 are 1, 2, 5, 6, 9, 10, 13, 14, those of the chart 42 are 1, 2, 3, 4, 9, 10, 11, 12 and those of the chart 43 are 1, 2, 3, 4, 5, 7, 8. Each chart has the same number of contents and the total of the different contents in all the charts 40–43 is 15. However, the total for subtraction should be one more than that, i.e. 15+1=16. In learning subtraction with this set, two persons, a teacher and a learner, take part. The teacher at first memorizes a content in any chart 40, 41, 42 or 43 and the learner asks the teacher which of the charts has the content he memorized, for example, the number 9. The teacher answers that the charts 40, 41, 42 have it, and then the learner finds out the designated numerals of the charts 40, 41, 42 and makes subtraction as follows, 16−1 (the chart 40)−2 (the chart 41)−4 (the chart 42)=9. So the learner gives the teacher the answer 9 which he memorized.

Figure 26:
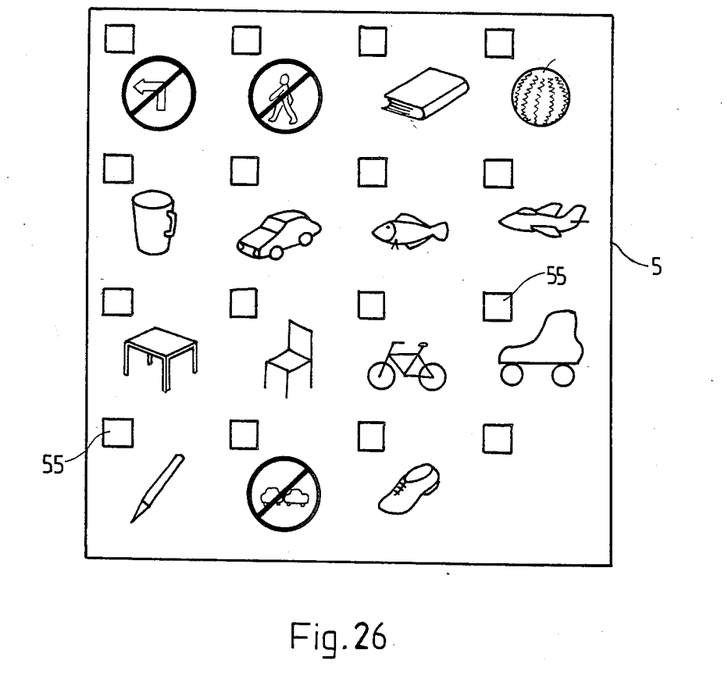
FIG. 26 is the main chart 5 in the fourth set of the learning aid in accordance with the present invention.
Figure 27:
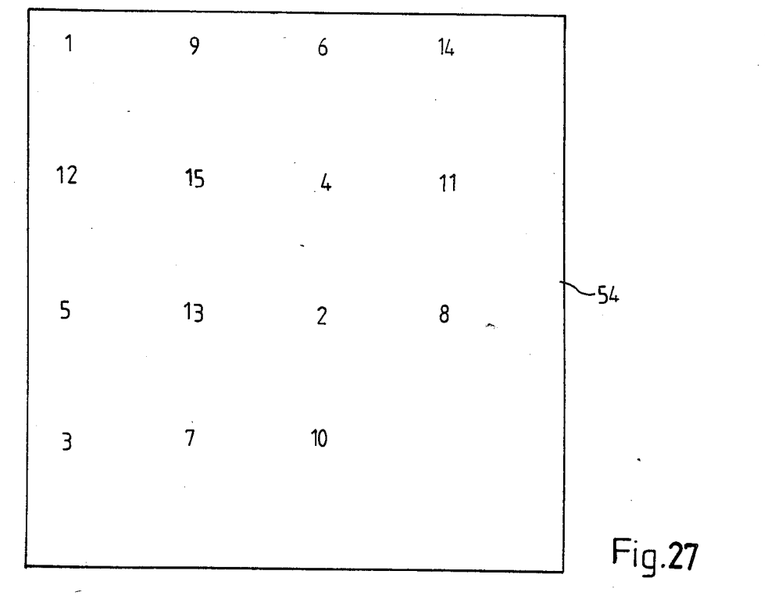
FIG. 27 is the numeral sheet 54 in the fourth set of the learning aid in accordance with the present invention.
Figure 28:
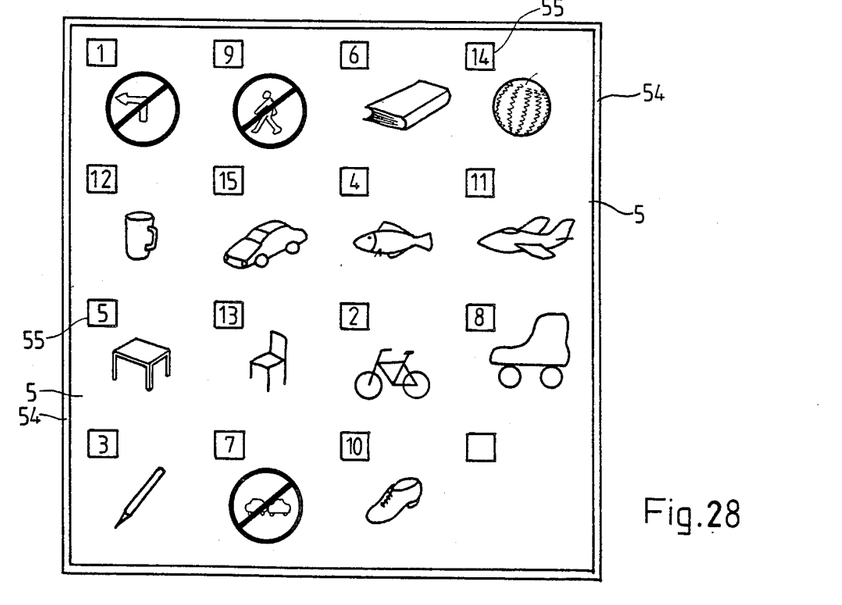
FIG. 28 is the main chart 5 combined on the numeral sheet 54 in the fourth set of the learning aid in accordance with the present invention.
Figure 29:
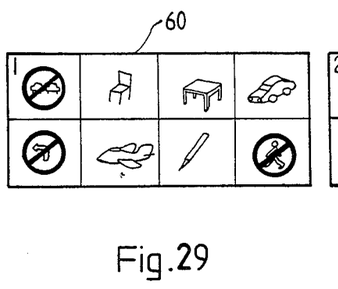
FIG. 29 is the auxiliary chart 60 for subtraction in the fifth set of the learning aid making use of FIGS. 18–21 in accordance with the present invention.
Figure 30:
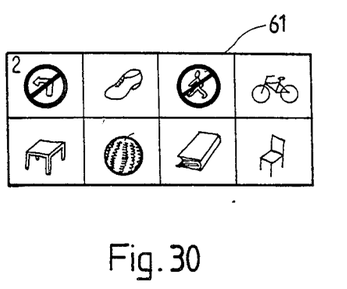
FIG. 30 is the auxiliary chart 61 for subtraction in the fifth set of the learning aid making use of FIGS. 18–21 in accordance with the present invention.
Figure 31:
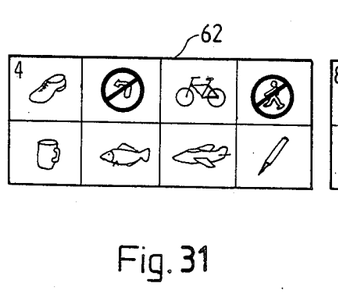
FIG. 31 is the auxiliary chart 62 for subtraction in the fifth set of the learning aid making use of FIGS. 18–21 in accordance with the present invention.
Figure 32:
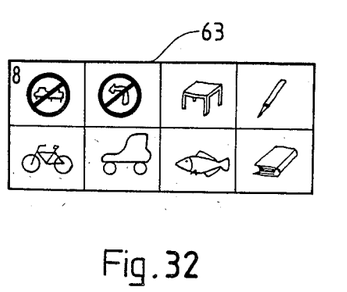
FIG. 32 is the auxiliary chart 63 for subtraction in the fifth set of the learning aid making use of FIGS. 18–21 in accordance with the present invention.

The fourth set of the learning aid shown in FIGS. 22-27 is used for learning addition based on the second set shown in FIGS. 14–17, but additionally includes a main chart 5 and a numeral sheet 54 besides four auxiliary charts 50-53. All the charts 50-53 can include numerals, alphabets, words, signs, animals, plants, flowers, fruits, etc, and have the same designated numerals each for addition just as the charts 30-33 do, i.e. 1, 2, 4, 8. The main chart 5 shown in FIG. 26 has all the different contents the charts 50-53 have and a small window 55 cut out respectively in each content for the numerals or the symbols on the numeral sheet 54 to appear therein when the main chart 5 is placed on the numeral sheet 54. The numeral sheet 54 has the same numerals at the same locations as the contents in the main chart 5 has so that the numerals can appear in the small windows 55 in case the sheet is put under the main chart 5 as shown in FIG. 27. The learning process begins with memorizing a content, for example a shoe, by the teacher and next the questions by the learner to learn which charts 51, 53 have the content the teacher memorized. Finally, the learner finds out the answer with addition, 2 (the chart 51)+8 (the chart 53)=10. Then he puts the main chart 5 exactly on the numeral sheet 54 and looks for the content where the numeral 10 is in the small window 55, as shown in FIG. 28. The learner now can give the answer to the teacher, i.e., a shoe.

Finally the fifth set of the learning aid shown in FIGS. 29-32 is used for subtraction based on the third set shown in FIGS. 18–21, but additionally includes a main chart as shown in FIG. 26 and a numeral sheet as shown in FIG. 27, as well as four auxiliary charts 60–63. The learning process is also performed by two persons as mentioned above. At first the teacher memorizes any content, for example a traffic sign for no left turning, and then the learner learns by questions that the content is included in the charts 60-63. Then he makes subtraction as follows: 16−1 (the chart 60)−2 (the chart 61)−4 (the chart 62)−8 (the chart 63)−1. Then he places the main chart on the numeral sheet and looks for the content where numeral 1 is in the small window, i.e., the traffic sign for no left turning. Therefore, the learner can learn subtraction and a traffic sign, in playing with the charts and through questions and answers.

In general, contents included in the charts have a wide range such as numerals, things, alphabets, animals, flowers, fruits, words, signs, etc, so this learning aid can supply children with attractive ways for learning simple addition and subtraction, recognizing signs, things, birds, flowers, fruits etc, by means of playing charts and asking and answering. Therefore, it can improve the learning effect for young children.

What is claimed is:

1. A learning aid, comprising:
   (a) a main chart having a number of symbols arranged at predetermined positions, one of said symbols being selected from all of the symbols;
   (b) a number of question-and-answer, auxiliary charts, each having a different group of said symbols, each symbol on the main chart appearing in at least one of said groups; and
   (c) a number of apertured, showing sheets separate from the auxiliary charts and identical in number to the number of auxiliary charts,
      (i) each showing sheet being keyed to a respective auxiliary chart and having a size identical to the main chart for superposition thereon in use,
      (ii) each showing sheet being independently movable between a first position overlying the main chart in a first direction and an inverted second position overlying the main chart and oriented in a second direction that is 180° away from the first direction,
      (iii) each showing sheet having apertures of the same size and arranged in different patterns,
      (iv) the apertures of each pattern of a respective showing sheet being located at positions in registry with the positions occupied by a respective group of symbols on the auxiliary chart keyed to the respective showing sheet when the latter is in the first position,
      (v) the apertures of each pattern of a respective showing sheet being located at positions out of registry with the positions occupied by a respective group of symbols on the auxiliary chart keyed to the respective showing sheet when the latter is in the second, inverted position,
      (vi) all of the showing sheets, when superimposed over the main chart, displaying the selected symbol through at least one of the apertures.

2. The learning aid as recited in claim 1, wherein each aperture is a square-shaped window, each window on all of the showing sheets being of an identical size.

3. The learning aid as recited in claim 1, wherein each symbol is a numeral.

4. The learning aid as recited in claim 1, wherein each symbol is a picture of a readily identifiable object.

5. The learning aid as recited in claim 1, wherein the symbols are arranged in rows and columns on the main chart.

6. An addition learning aid, comprising:

(a) a plurality of number charts, each having a plurality of numerals, one of which is selected by one person for subsequent identification by another person, the number of numerals for each chart being the same, at least one of the numerals on each chart being different from the numerals on the other charts, at least one of the charts having the selected numeral; and (b) a predetermined designated numeral associated with each chart and being different for each chart, the designated numeral for each chart having the selected numeral being added in succession by the other person and totaling the selected numeral.

7. The learning aid as recited in claim 6, wherein a first of the charts is associated with the predetermined designated numerals 1 and has the numerals 1, 3, 5, 7, 9, 11, 13 and 15; wherein a second of the charts is associated with the predetermined designated numeral 2 and has the numerals 2, 3, 6, 7, 10, 11, 14 and 15; wherein a third of the charts is associated with the predetermined designated numeral 4 and has the numerals 4, 5, 6, 7, 12, 13, 14 and 15; and wherein a fourth of the charts is associated with the predetermined designated numeral 8 and has the numerals 8, 9, 10, 11, 12, 13, 14 and 15.

8. A subtraction learning aid, comprising:

(a) a plurality of number charts, each having a plurality of numerals, one of which is selected by one person for subsequent identification by another person, the number of numerals for each chart being the same, at least one of the numerals on each chart being different from the numberals on the other charts, at least one of the charts having the selected numeral;

(b) a predetermined designated numeral associated with each chart and being different for each chart;

(c) a master numeral being one more than the sum of all of the predetermined designated numerals; and (d) the designated numeral for each chart having the selected numeral being subtracted in succession from the master numeral by the other person and totaling the selected numeral.

9. The learning aid as recited in claim 8, wherein a first of the charts is associated with the predetermined designated numeral 1 and has the numerals 1, 3, 5, 7, 9, 11, 13 and 15; wherein a second of the charts is associated with the predetermined designated numeral 2 and has the numerals 1, 2, 5, 6, 9, 10, 13 and 14; wherein a third of the charts is associated with the predetermined designated numeral 4 and has the numerals 1, 2, 3, 4, 9, 10, 11 and 12; wherein a fourth of the charts is associated with the predetermined designated numeral 8 and has the numerals 1, 2, 3, 4, 5, 6, 7 and 8; and wherein the master numeral is 16.

10. A learning aid, comprising:

(a) an apertured, main chart having a plurality of symbols arranged at predetermined positions, and a plurality of apertures, one for each symbol at each predetermined position, one of the symbols being selected by one person from all of the symbols;

(b) a number of question-and-answer, auxiliary charts, each having a different group of said symbols, each symbol on the main chart appearing in at least one of said groups;

(c) a predetermined designated numeral associated with each auxiliary chart and being different for each auxiliary chart;

(d) a numeral chart having a plurality of numerals arranged at said predetermined positions and appearing through the apertures when the main chart is superimposed on the numeral chart, each numeral on the numeral chart being keyed to a respective symbol on the main chart;

(e) the designated numeral for each auxiliary chart having the selected symbol being added in succession by another person and amounting to a total number; and (f) the main chart, when superimposed over the numeral chart, displaying the total number through at least one of the apertures, thereby indicating to the other person the selected symbol associated with the total number.

11. A learning aid, comprising:

(a) an apertured, main chart having a plurality of symbols arranged at predetermined positions, and a plurality of apertures, one of each symbol at each predetermined position, one of the symbols being selected by one person from all of the symbols;

(b) a number of question-and-answer, auxiliary charts, each having a different group of said symbols, each symbol on the main chart appearing in at least one of said groups;

(c) a predetermined designated numeral associated with each auxiliary chart and being different for each auxiliary chart;

(d) a master numeral being one more than the sum of all of the predetermined designated numerals;

(e) a number chart having a plurality of numerals arranged at said predetermined positions and appearing through the apertures when the main chart is superimposed on the numeral chart, each numeral on the numeral chart being keyed to a respective symbol on the main chart;

(f) the designated numeral for each auxiliary chart having the selected symbol being subtracted in succession from the master numeral by another person and amounting to a total number; and (g) the main chart, when superimposed over the numeral chart, displaying the total number through at least one of the apertures, thereby indicating to the other person the selected symbol associated with the total number.

* * * * *